US012669997B2

(12) United States Patent
Rauh et al.

(10) Patent No.: US 12,669,997 B2
(45) Date of Patent: Jun. 30, 2026

(54) SCHEDULABLE ASYNCHRONOUS METHODS WITH SEMI-REACTIVE COMPLETION STAGES

(71) Applicant: International Business Machines Corporation, Armonk, NY (US)

(72) Inventors: Nathan Jon Rauh, Rochester, MN (US); Alex Seitzinger Motley, Rochester, MN (US); James Stephens, Palisade, MN (US); Mark Swatosh, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 17/815,335

(22) Filed: Jul. 27, 2022

(65) Prior Publication Data

US 2024/0036868 A1     Feb. 1, 2024

(51) Int. Cl.
*G06F 9/30*          (2018.01)
*G06F 9/38*          (2018.01)
*G06F 9/50*          (2006.01)

(52) U.S. Cl.
CPC ........ *G06F 9/30174* (2013.01); *G06F 9/3836* (2013.01); *G06F 9/5027* (2013.01)

(58) Field of Classification Search
CPC .. G06F 9/30174; G06F 9/3836; G06F 9/5027; G06F 9/548; G06F 9/4887
IPC .................................................. G06F 9/30174
See application file for complete search history.

(56) References Cited

U.S. PATENT DOCUMENTS

| | | | | |
|---|---|---|---|---|
| 9,015,533 | B1 * | 4/2015 | Fateev | ................ G06F 11/0793 |
| | | | | 714/38.1 |
| 9,152,533 | B1 | 10/2015 | Fateev | |
| 9,645,845 | B2 * | 5/2017 | Marwinski | ............ G06F 9/4843 |
| 10,380,215 | B2 | 8/2019 | De Coninck Owe | |
| 10,540,417 | B2 | 1/2020 | De Coninck Owe | |
| 10,572,286 | B2 | 2/2020 | Driever et al. | |
| 10,592,451 | B2 | 3/2020 | Driever et al. | |
| 10,613,834 | B2 | 4/2020 | Sahoo et al. | |
| 10,846,125 | B2 | 11/2020 | Driever et al. | |
| 2002/0118193 | A1 * | 8/2002 | Halstead, Jr. | ........... G06T 11/60 |
| | | | | 345/440 |
| 2005/0273674 | A1 | 12/2005 | Shinn et al. | |
| 2009/0300591 | A1 | 12/2009 | Duffy et al. | |

(Continued)

OTHER PUBLICATIONS

Aliaksandr Liakh. "Asynchronous programming in Java with CompletableFuture". LinkedIn, Feb. 28, 2021, https://www.linkedin.com/pulse/asynchronous-programming-java-completablefuture-aliaksandr-liakh. Accessed Sep. 17, 2025. (Year : 2021).*

(Continued)

*Primary Examiner* — Aimee Li
*Assistant Examiner* — Andrew Sun
(74) *Attorney, Agent, or Firm* — Yee & Associates, P.C.

(57) ABSTRACT

Processing methods is provided. A method is designated as schedulable. A completion stage is generated for the method. A return of the completion stage corresponding to the method is received. It is determined whether a state of the completion stage indicates continued execution of the method. In response to determining that the state of the completion stage does indicate continued execution of the method, a set of executions of the method is continued based on an execution return of the method being a null return.

20 Claims, 5 Drawing Sheets

(56)    References Cited

U.S. PATENT DOCUMENTS

| | | | |
|---|---|---|---|
| 2012/0096471 A1* | 4/2012 | Jang ..................... | G06F 9/5027 |
| | | | 718/103 |
| 2014/0053157 A1* | 2/2014 | Zhao ..................... | G06F 9/485 |
| | | | 718/100 |
| 2021/0182102 A1* | 6/2021 | Wang ................... | G06F 9/4887 |
| 2023/0244533 A1* | 8/2023 | Bhandari ............. | G06F 9/5072 |
| | | | 718/104 |

OTHER PUBLICATIONS

Anonymous, "Quantum Developer Visualization Tool (QDVT)," An IP.com Prior Art Database Technical Disclosure, IPCOM000261581D, Mar. 18, 2020, 8 pages.

Anonymous, "Managing situations and actions for complex event processing," An IP.com Prior Art Database Technical Disclosure, IPCOM000263837D, Oct. 9, 2020, 8 pages.

Anonymous, "Method for Scalable Composition of Independent Real-Time Activities (SCIRTA) on Massively Parallel Non-Uniform Memory Access (NUMA) Platforms," An IP.com Prior Art Database Technical Disclosure, IPCOM000265191D, Mar. 10, 2021, 15 pages.

Schmidt, "Advanced Java Completable Future Features: Applying Completion Stage Methods," Vanderbilt University Nashville, Tennessee, accessed Jul. 27, 2022, 26 pages. http://www.dre.vanderbilt.edu/~schmidt/cs253/2021-PDFs/13.5.2-implementing-FuturesCollector.pdf.

* cited by examiner

COMPUTING ENVIRONMENT
100

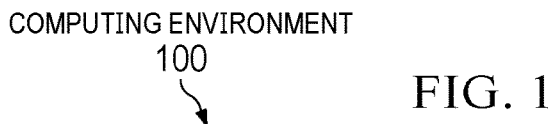

FIG. 1

COMPUTER    <u>101</u>

PROCESSOR SET    <u>110</u>

120 — PROCESSING CIRCUITRY        CACHE    —121

111 — COMMUNICATION FABRIC

112 — VOLATILE MEMORY

PERSISTENT STORAGE    <u>113</u>

122 — OPERATING SYSTEM        ASYNCHRONOUS METHOD PROCESSING CODE    —200

PERIPHERAL DEVICE SET    <u>114</u>

123 — UI DEVICE SET        124 — STORAGE        IoT SENSOR SET    —125

NETWORK MODULE    <u>115</u>

END USER DEVICE    —103

WAN    <u>102</u>

REMOTE SERVER
REMOTE DATABASE    —130    —104

PRIVATE CLOUD    —106

GATEWAY    <u>140</u>

PUBLIC CLOUD    <u>105</u>

141 — CLOUD ORCHESTRATION MODULE        HOT PHYSICAL MACHINE SET    —142

143 — VIRTUAL MACHINE SET        CONTAINER SET    —144

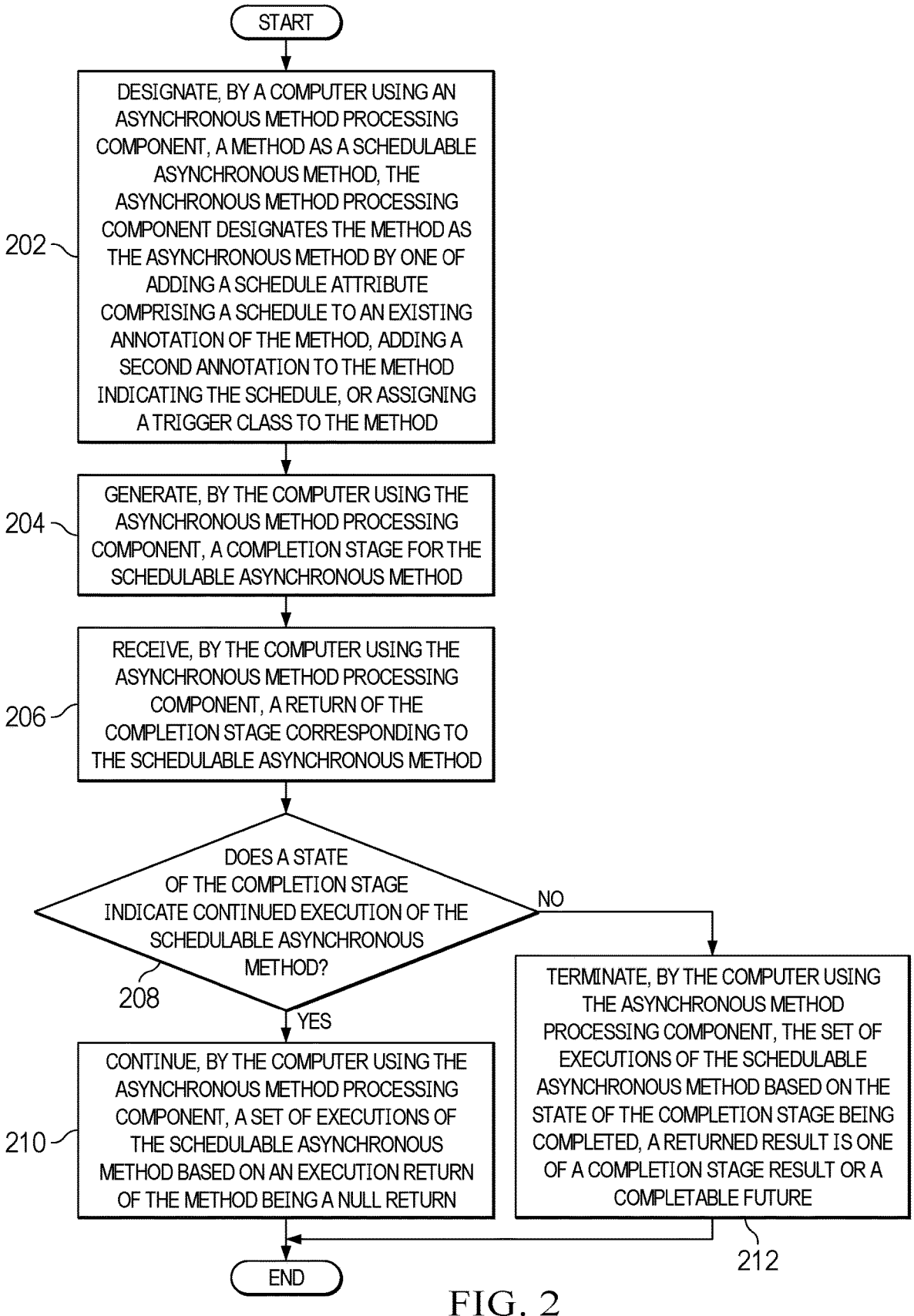

START

202 — DESIGNATE, BY A COMPUTER USING AN ASYNCHRONOUS METHOD PROCESSING COMPONENT, A METHOD AS A SCHEDULABLE ASYNCHRONOUS METHOD, THE ASYNCHRONOUS METHOD PROCESSING COMPONENT DESIGNATES THE METHOD AS THE ASYNCHRONOUS METHOD BY ONE OF ADDING A SCHEDULE ATTRIBUTE COMPRISING A SCHEDULE TO AN EXISTING ANNOTATION OF THE METHOD, ADDING A SECOND ANNOTATION TO THE METHOD INDICATING THE SCHEDULE, OR ASSIGNING A TRIGGER CLASS TO THE METHOD

204 — GENERATE, BY THE COMPUTER USING THE ASYNCHRONOUS METHOD PROCESSING COMPONENT, A COMPLETION STAGE FOR THE SCHEDULABLE ASYNCHRONOUS METHOD

206 — RECEIVE, BY THE COMPUTER USING THE ASYNCHRONOUS METHOD PROCESSING COMPONENT, A RETURN OF THE COMPLETION STAGE CORRESPONDING TO THE SCHEDULABLE ASYNCHRONOUS METHOD

208 — DOES A STATE OF THE COMPLETION STAGE INDICATE CONTINUED EXECUTION OF THE SCHEDULABLE ASYNCHRONOUS METHOD?

NO

YES

210 — CONTINUE, BY THE COMPUTER USING THE ASYNCHRONOUS METHOD PROCESSING COMPONENT, A SET OF EXECUTIONS OF THE SCHEDULABLE ASYNCHRONOUS METHOD BASED ON AN EXECUTION RETURN OF THE METHOD BEING A NULL RETURN

TERMINATE, BY THE COMPUTER USING THE ASYNCHRONOUS METHOD PROCESSING COMPONENT, THE SET OF EXECUTIONS OF THE SCHEDULABLE ASYNCHRONOUS METHOD BASED ON THE STATE OF THE COMPLETION STAGE BEING COMPLETED, A RETURNED RESULT IS ONE OF A COMPLETION STAGE RESULT OR A COMPLETABLE FUTURE — 212

END

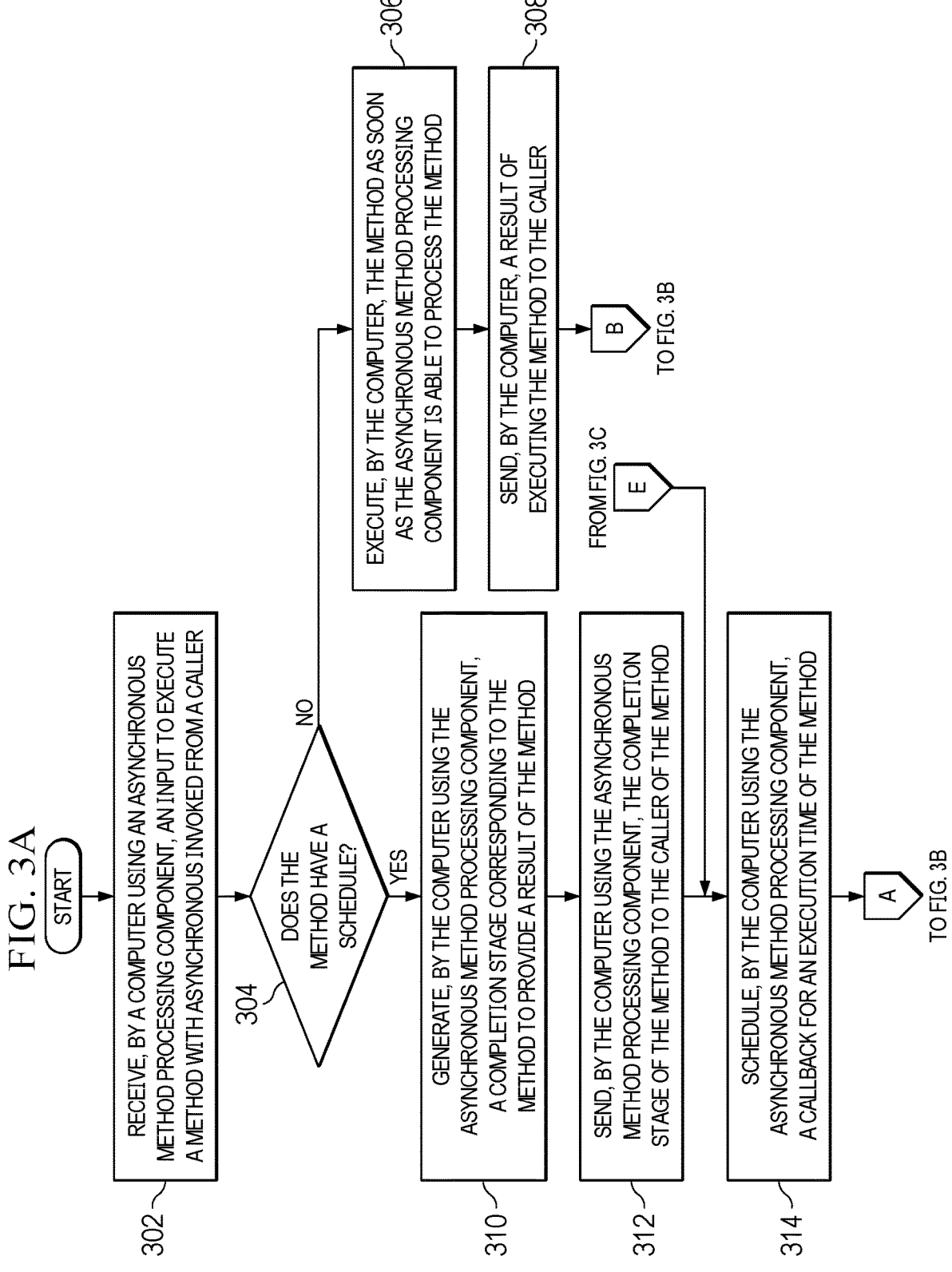

START

302 — RECEIVE, BY A COMPUTER USING AN ASYNCHRONOUS METHOD PROCESSING COMPONENT, AN INPUT TO EXECUTE A METHOD WITH ASYNCHRONOUS INVOKED FROM A CALLER

304 — DOES THE METHOD HAVE A SCHEDULE?

NO

306 — EXECUTE, BY THE COMPUTER, THE METHOD AS SOON AS THE ASYNCHRONOUS METHOD PROCESSING COMPONENT IS ABLE TO PROCESS THE METHOD

308 — SEND, BY THE COMPUTER, A RESULT OF EXECUTING THE METHOD TO THE CALLER

B    TO FIG. 3B

FROM FIG. 3C

E

YES

310 — GENERATE, BY THE COMPUTER USING THE ASYNCHRONOUS METHOD PROCESSING COMPONENT, A COMPLETION STAGE CORRESPONDING TO THE METHOD TO PROVIDE A RESULT OF THE METHOD

312 — SEND, BY THE COMPUTER USING THE ASYNCHRONOUS METHOD PROCESSING COMPONENT, THE COMPLETION STAGE OF THE METHOD TO THE CALLER OF THE METHOD

314 — SCHEDULE, BY THE COMPUTER USING THE ASYNCHRONOUS METHOD PROCESSING COMPONENT, A CALLBACK FOR AN EXECUTION TIME OF THE METHOD

A    TO FIG. 3B

SCHEDULABLE ASYNCHRONOUS METHODS WITH SEMI-REACTIVE COMPLETION STAGES

BACKGROUND

1. Field

The disclosure relates generally to Java methods and more specifically to providing a programming model that allows a Java method to be simultaneously designated as both asynchronous, backed by a completion stage or a completable future, and operating on a designated schedule.

2. Description of the Related Art

Java®, which is a registered trademark of Oracle America, Inc., of Redwood Shores, California, USA, is a high-level, class-based, object-oriented programming language that is designed to have as few implementation dependencies as possible. Java is a general-purpose programming language intended to let programmers write once, run anywhere, meaning that compiled Java code can run on all platforms that support Java without the need to recompile. Java applications are typically compiled to bytecode that can run on any Java virtual machine regardless of the underlying computer architecture. The syntax of Java is similar to C and C++, but has fewer low-level facilities than either of them. The Java runtime provides dynamic capabilities (such as reflection and runtime code modification) that are typically not available in traditional compiled languages. A method in Java or Java method is a collection of statements that performs a specific task and returns the result to the caller.

A completion stage is a feature for asynchronous programming using Java. Unlike procedural programming, asynchronous programming means writing non-blocking code that runs tasks on separate pooled threads instead of on the main application thread and keeps notifying the main thread about the progress, completion status, or if the task fails. As a result, the main application thread does not get blocked while waiting for the completion of a task as it can be executed in parallel. This kind of parallelism can increase the performance of programs and the time taken for execution.

A completion stage performs a task and returns a value when the completion stage completes. A completion stage completes upon termination of its computation, but this may in turn trigger a set of dependent completion stages. In other words, a completion stage of an asynchronous computation can perform a task or compute a value after another completion stage completes. Thus, multiple completion stages can be chained together to complete a set of tasks. A completable future is a class in Java. A completable future is a type of completion stage and is also used for asynchronous programming.

SUMMARY

According to one illustrative embodiment, a computer-implemented method for processing methods is provided. A computer designates a method as schedulable. The computer generates a completion stage for the method. The computer receives a return of the completion stage corresponding to the method. The computer determines whether a state of the completion stage indicates continued execution of the method. In response to the computer determining that the state of the completion stage does indicate continued execution of the method, the computer continues a set of executions of the method based on an execution return of the method being a null return. According to other illustrative embodiments, a computer system and computer program product for processing methods are provided.

BRIEF DESCRIPTION OF THE DRAWINGS

FIG. 1 is a pictorial representation of a computing environment in which illustrative embodiments may be implemented;

FIG. 2 is a flowchart illustrating a process for processing a schedulable asynchronous method in accordance with an illustrative embodiment; and FIGS. 3A-3C are a flowchart illustrating a process for processing a result of a completion stage corresponding to a method with asynchronous invoked in accordance with an illustrative embodiment.

DETAILED DESCRIPTION

Figure 3B:
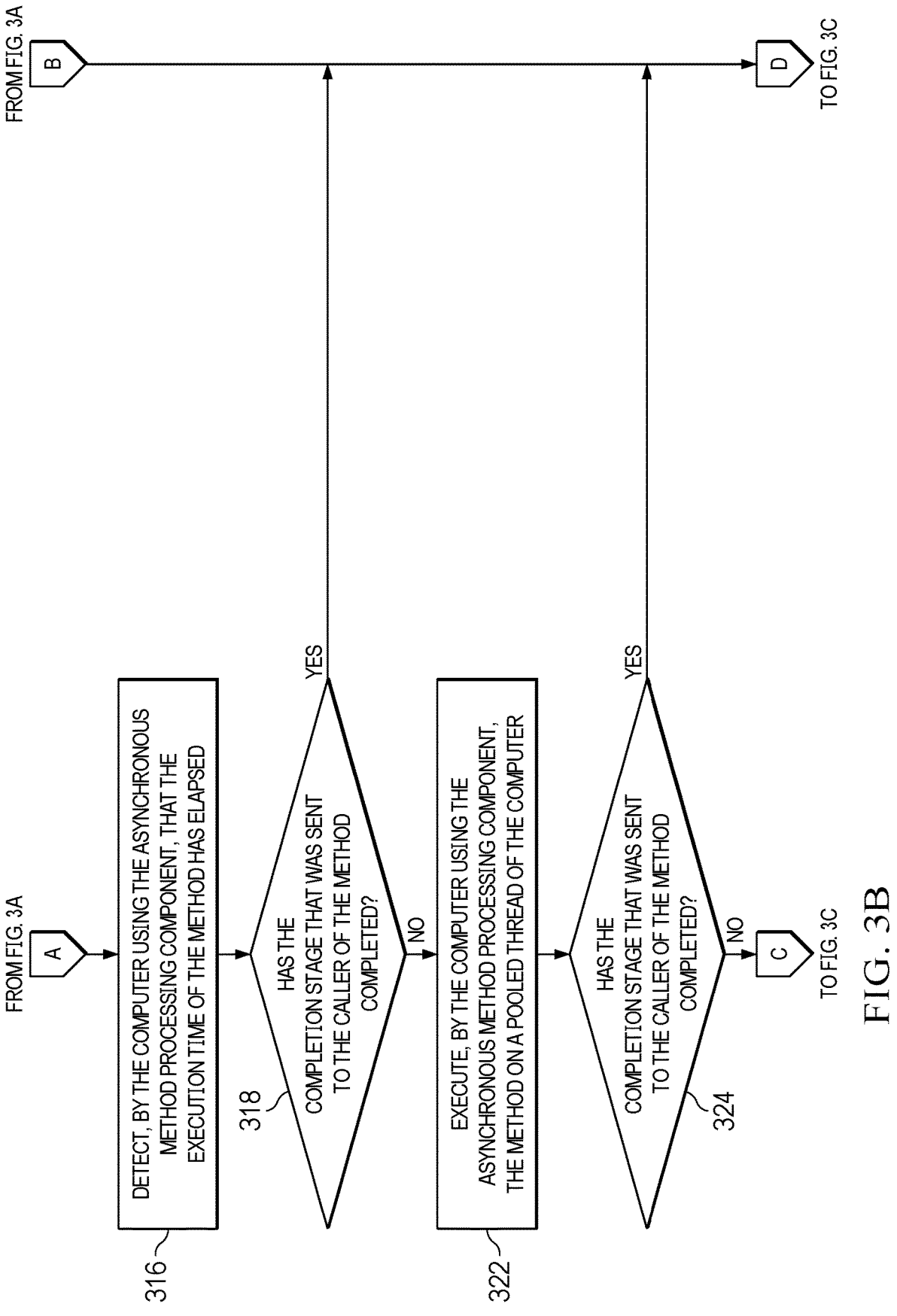

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

With reference now to the figures, and in particular, with reference to FIG. 1, a diagram of a data processing environment is provided in which illustrative embodiments may be implemented. It should be appreciated that FIG. 1 is only meant as an example and is not intended to assert or imply any limitation with regard to environments in which different embodiments may be implemented. Many modifications to the depicted computing environment may be made.

FIG. 1 shows a pictorial representation of a computing environment in which illustrative embodiments may be implemented. Computing environment 100 contains an example of an environment for the execution of at least some of the computer code involved in performing the inventive methods, such as asynchronous method processing code 200. Asynchronous method processing code 200 provides a novel programming model that allows a method to be simultaneously designated as both asynchronous, backed by a completion stage or a completable future, and operating on a designated schedule. This novel programming model enables program developers to chain dependent completion stages to an eventual completion of a final scheduled execution of the asynchronous method, which can be determined either dynamically or programmatically. In addition to asynchronous method processing code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The asynchronous method processing code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (e.g., a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (e.g., cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (e.g., private, community, or public cloud types), often respectively implemented by different vendors.

Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Java utilizes completion stages and completable futures (e.g., a type of completion stage) to enable a partly reactive programming model where pipelines of dependent stages are chained to the completion of a prior stage. This concept was combined with an ability to annotatively designate a Java method for potential asynchronous execution by a container (e.g., an asynchronous method processing component), with a completion stage or completable future representing the result of the Java method. Separately, the Jakarta Enterprise Beans specification introduced the concept of Enterprise Java Beans timer methods that run upon a schedule that is specified either programmatically or annotatively. However, these existing solutions are limited to either being able to use asynchronous methods backed by completion stages or to methods that run on a schedule. Currently, no solution exists that combines asynchronous methods backed by completion stages and methods that run on a schedule. In fact, the Jakarta EE® Concurrency 3.0 specification bans the use of its asynchronous annotation on Jakarta® Enterprise Beans due to a conflict between similar annotations. Jakarta EE and Jakarta are registered trademarks of Eclipse.org Foundation, Inc., of Ottawa, CAN.

Illustrative embodiments enable a programming model that allows a method to be simultaneously designated as both asynchronous, backed by a completion stage or completable future, and operating on a designated schedule. Illustrative embodiments provide a programming model that is useful to an end user (e.g., a method provider such as a program developer, a method caller, or the like) by chaining dependent stages to the ultimate completion of a final scheduled execution of the method, which may be determined dynamically and/or programmatically.

One mechanism to indicate a schedulable asynchronous method is to add a schedule attribute or a set of attributes comprising a schedule, such as, for example, month, day, hour, minute, second, and time zone, to an existing annotation of the method that designates the method as asynchronous. The absence of a schedule means not scheduled (e.g., a normal asynchronous method that runs once as soon as the container is able to run the method according to the existing architecture and design). Another mechanism to indicate a schedulable asynchronous method is to add a second annotation to the method indicating the schedule. Yet another mechanism to indicate a schedulable asynchronous method is to assign a trigger class to the method for increased flexibility at run time instead of using a schedule expression. It should be noted that the exact mechanism for indicating the schedule can vary across alternative illustrative embodiments. However, as used in examples herein, illustrative embodiments utilize the first mechanism above of adding a single schedule attribute to the existing annotation of the method designating the method as asynchronous because it matches with the Jakarta EE Concurrency 3.0 specification's @Asynchronous.

Illustrative embodiments follow the Jakarta EE Concurrency 3.0 specification, which allows a return type of an asynchronous method to be one of a void return, a completion stage return, or a completable future return. Each of these return types allows illustrative embodiments to translate a return value or a failure for each execution of a particular method into a single completion stage result that represents the entire set of executions of that particular method.

Existing asynchronous methods of the Jakarta EE Concurrency 3.0 specification are designed for one-time execution. Raising an exception or returning a NULL from the asynchronous method simply completes the completion stage of the asynchronous method that illustrative embodiments send back to the end user (e.g., method caller), either exceptionally indicating failure of the asynchronous method or with a NULL value if NULL is returned from the asynchronous method. Returning an already-completed completion stage from the asynchronous method causes illustrative embodiments to immediately complete the completion stage, which illustrative embodiments send back to the caller, in the same manner (e.g., result value of the completion stage of the asynchronous method, failure of the asynchronous method, cancellation of the asynchronous method, or the like). Returning an incomplete completion stage from the asynchronous method causes illustrative embodiments to complete the incomplete completion stage, which illustrative embodiments send back to the user, in the same manner using an eventual result of a different completion stage returned by the asynchronous method. In order for the asynchronous method to return a completion stage to the caller prior to execution of the asynchronous method finishing (or even starting), it is necessary for the container (e.g., an asynchronous method processing component of an application server such as asynchronous method processing code 200 of computer 101 in FIG. 1) to generate the completion stage for the asynchronous method so that illustrative embodiments can return the completion stage to the caller independent of any completion stage generated by that particular asynchronous method.

The involvement of two completion stages adds complexity. Therefore, the Jakarta EE Concurrency 3.0 specification provides an Asynchronous.Result Application Programming Interface, which exposes the container-generated completion stage to the asynchronous method, such that illustrative embodiments only utilize a single completion stage. The asynchronous method can manipulate this container-generated completion stage, including completing the container-generated completion stage exceptionally or with a successful result, and return this container-generated completion stage from the asynchronous method. Regardless of how the asynchronous method arranges to complete the container-generated completion stage and whether the asynchronous method utilizes a different completion stage generated by the asynchronous method, the caller has the ability to forcibly complete the completion stage (e.g., exceptionally or with a successful result), which illustrative embodiments return to the caller. When illustrative embodiments make multiple attempts to complete the same completion stage, the completion attempt that completes or finishes first is the completion that counts. In other words, latter attempts at completion of the same completion stage have no effect. This is how existing asynchronous methods of the Jakarta EE Concurrency 3.0 specification are designed for one-time execution. Illustrative embodiments take into account and address all of these same forms of returns from the asynchronous method for asynchronous methods that are scheduled for repeatable execution.

Illustrative embodiments distinguish between a return type of an asynchronous method that indicates continued execution of the asynchronous method and a return type from the asynchronous method that indicates a completion of the completion stage terminating execution of the asynchronous method. For an asynchronous method that lacks a return value, illustrative embodiments forcibly complete the container-generated completion stage within the asynchronous method to indicate final execution. In this case, whether the asynchronous method returns normally or exceptionally makes no difference because the container-generated completion stage has already completed. Returning normally (e.g., with no exception) from the asynchronous method while the container-generated completion stage is still incomplete indicates that additional execution of the asynchronous method is necessary. Raising an exception from the asynchronous method indicates termination of the set of executions of the asynchronous method (i.e., the asynchronous method is not scheduled to run again) and causes exceptional completion of the completion stage indicating failure of the asynchronous method, which illustrative embodiments send to the end user (e.g., method caller).

For an asynchronous method that returns a completion stage or a completable future, illustrative embodiments forcibly complete the container-generated completion stage within the asynchronous method to indicate final execution of the asynchronous method. In this case, whether the asynchronous method returns normally or exceptionally makes no difference because the container-generated completion stage has already completed. Receiving a return from the asynchronous method while the container-generated completion stage remains incomplete causes illustrative embodiments to indicate one of a plurality of different possibilities. For example, receiving a return of an exception from the asynchronous method causes illustrative embodiments to indicate final execution of the asynchronous method and cause exceptional completion of the completion stage indicating failure of the asynchronous method. As another possibility, receiving a return of a NULL (i.e., no result) from the asynchronous method causes illustrative embodiments to indicate that additional execution of the asynchronous method is needed. As yet another possibility, receiving a return of an already-completed completion stage from the asynchronous method causes illustrative embodiments to indicate final execution of the asynchronous method and cause the completion stage, which illustrative embodiments send to the caller, to be completed immediately in the same manner (e.g., with the same result value or same exceptional completion). As yet another possibility, receiving a return of a different incomplete completion stage (i.e., not a completion stage generated by the container for the caller, but a completion stage generated by the asynchronous method) from the asynchronous method causes illustrative embodiments to indicate final execution of the asynchronous method and cause the container-generated completion stage to be completed in the same manner upon eventual completion of the different incomplete completion stage generated by the asynchronous method. As yet another possibility, receiving a return of the still incomplete completion stage, which the container generated for the caller, from the asynchronous method causes illustrative embodiments to indicate final execution of the asynchronous method. An asynchronous method that does this should arrange for the eventual completion of the still incomplete completion stage.

Illustrative embodiments enable patterns such as, for example:

```
@Asynchronous(schedule = "0 8 * * MON-FRI America/Chicago")
CompletionStage<Integer> repeatDailyUntilDone(int i, String s) {
    try {
        ...
    } catch (SomeException x) {
        throw new CompletionException(x);
    }
    if (hasMoreToDoNextBusinessDay)
        return null; // no result yet
    else
        return Asynchronous.Result.complete(value);
}
repeatDailyUntilDone.exceptionally(this::handleError)
    .thenAccept(this::saveResult);
```

Thus, illustrative embodiments cause a set of executions of a scheduled asynchronous method to keep running in response to receiving a return of NULL from the scheduled asynchronous method while the container-generated completion stage remains incomplete. To cause the scheduled asynchronous method to cease further executions, illustrative embodiments take other actions, such as, for example, forcibly complete the completion stage, cancel the scheduled asynchronous method, or the like. As a result, illustrative embodiments provide one or more technical solutions that overcome a technical problem with combining asynchronous methods backed by completion stages or completable futures and methods that run on a schedule. As a result, these one or more technical solutions provide a technical effect and practical application in the field of schedulable asynchronous method processing.

With reference now to FIG. 2, a flowchart illustrating a process for processing a schedulable asynchronous method is shown in accordance with an illustrative embodiment. The process shown in FIG. 2 may be implemented in a computer, such as, for example, computer 101 in FIG. 1. For example, the process shown in FIG. 2 may be implemented in asynchronous method processing code 200 in FIG. 1.

The process begins when the computer, using an asynchronous method processing component of the computer, designates a method as a schedulable asynchronous method (step 202). The asynchronous method processing component designates the method as the schedulable asynchronous method by one of adding a schedule attribute comprising a schedule to an existing annotation of the method, adding a second annotation to the method indicating the schedule, or assigning a trigger class to the method. In addition, the computer, using the asynchronous method processing component, generates a completion stage for the schedulable asynchronous method (step 204).

Subsequently, the computer, using the asynchronous method processing component, receives a return of the completion stage corresponding to the schedulable asynchronous method (step 206). The computer, using the asynchronous method processing component, makes a determination as to whether a state of the completion stage indicates continued execution of the schedulable asynchronous method (step 208).

If the computer, using the asynchronous method processing component, determines that the state of the completion stage does indicate continued execution of the schedulable asynchronous method, yes output of step 208, then the computer, using the asynchronous method processing component, continues a set of executions of the schedulable asynchronous method based on an execution return of the method being a null return (step 210). If the computer, using the asynchronous method processing component, determines that the state of the completion stage does not indicate continued execution of the schedulable asynchronous method, no output of step 208, then the computer, using the asynchronous method processing component, terminates the set of executions of the schedulable asynchronous method based on the state of the completion stage being completed (step 212). A returned result is one of a completion stage result or a completable future in response to the completion stage being completed successfully, or otherwise by exceptional completion. Thereafter, the process terminates.

Figure 3C:
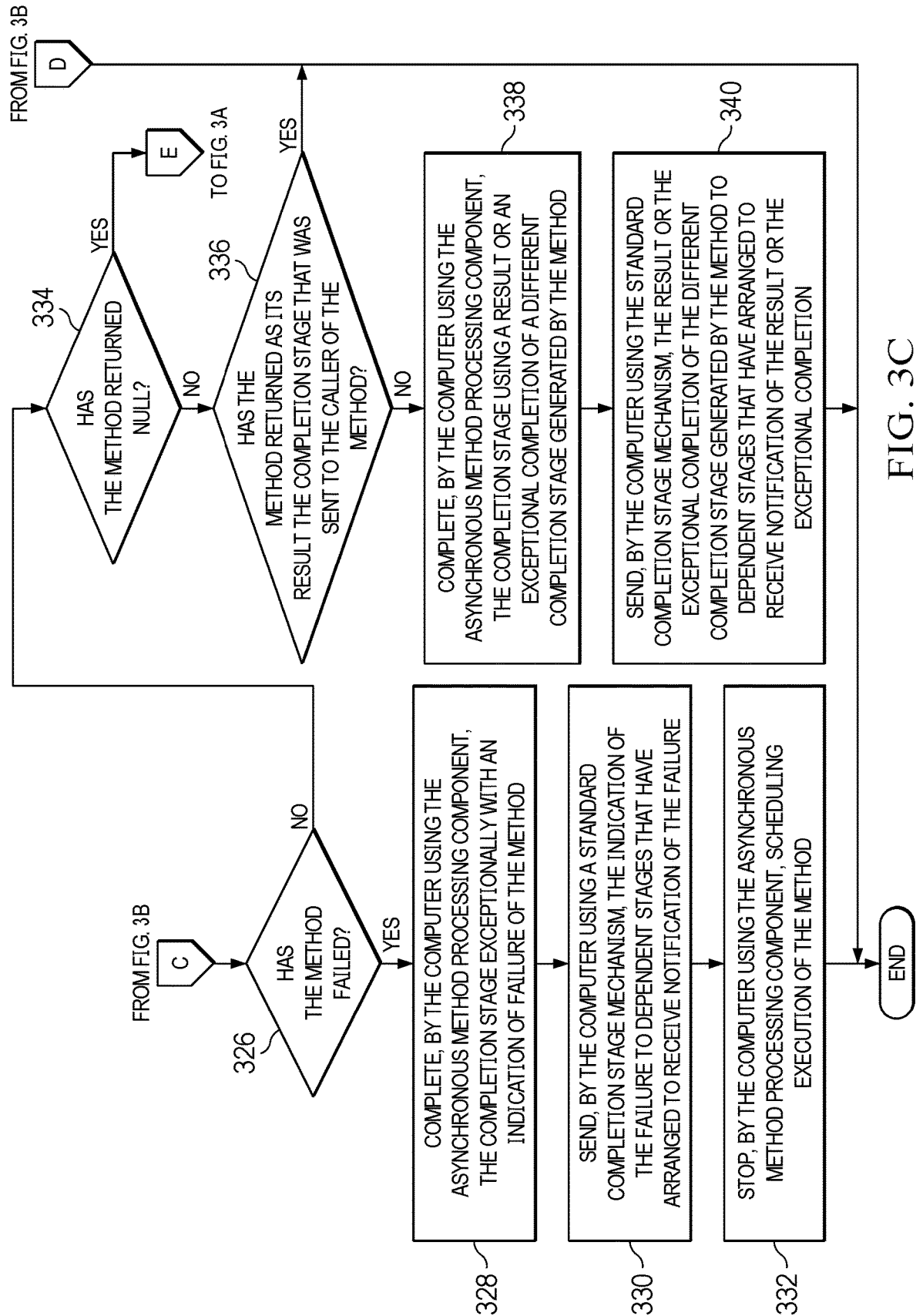

With reference now to FIGS. 3A-3C, a flowchart illustrating a process for processing a result of a completion stage corresponding to a method with asynchronous invoked is shown in accordance with an illustrative embodiment. The process shown in FIGS. 3A-3C may be implemented in a computer, such as, for example, computer 101 in FIG. 1. For example, the process shown in FIGS. 3A-3C may be implemented in asynchronous method processing code 200 in FIG. 1.

The process begins when the computer, using an asynchronous method processing component of the computer, receives an input to execute a method with asynchronous invoked from a caller (step 302). In response to receiving the input to execute the method with asynchronous invoked from the caller, the computer, using the asynchronous method processing component, makes a determination as to whether the method has a schedule (step 304).

If the computer, using the asynchronous method processing component, determines that the method does not have a schedule, no output of step 304, then the computer executes the method as soon as the asynchronous method processing component is able to process the method (step 306). Afterward, the computer sends a result of executing the method to the caller (step 308). Thereafter, the process terminates.

Returning again to step 304, if the computer, using the asynchronous method processing component, determines that the method does have a schedule, yes output of step 304, then the computer, using the asynchronous method processing component, generates a completion stage corresponding to the method to provide a final result of the method (step 310). The completion stage tracks execution of a full set of executions of the method. In addition, the computer, using the asynchronous method processing component, sends the completion stage of the method to the caller of the method (step 312). Further, the computer, using the asynchronous method processing component, schedules a callback for an execution time of the method (step 314).

Subsequently, the computer, using the asynchronous method processing component, detects that the execution time of the method has elapsed (step 316). In response to detecting that the execution time of the method has elapsed or at any time prior to the execution time of the method elapsing, the computer, using the asynchronous method processing component, makes a determination as to whether the completion stage that was previously sent to the caller of the method at step 312 has completed (step 318).

If the computer, using the asynchronous method processing component, determines that the completion stage of the method has completed, yes output of step 318, then the process terminates thereafter. If the computer, using the asynchronous method processing component, determines that the completion stage that was previously sent to the caller of the method at step 312 has not completed, no output of step 318, then the computer, using the asynchronous method processing component, executes the method on a pooled thread of the computer (step 322).

In response to executing the method on the pooled thread of the computer, the computer, using the asynchronous method processing component, once again makes a determination as to whether the completion stage that was previously sent to the caller of the method at step 312 has completed (step 324). If the computer, using the asynchronous method processing component, determines that the completion stage that was previously sent to the caller of the method at step 312 has completed, yes out of step 324, then the process terminates thereafter. If the computer, using the asynchronous method processing component, determines that the completion stage that was previously sent to the caller of the method at step 312 has not completed, no out of step 324, then the computer, using the asynchronous method processing component, makes a determination as to whether the method failed during execution on the pooled thread (step 326).

If the computer, using the asynchronous method processing component, determines that the method has failed, yes output of step 326, then the computer, using the asynchronous method processing component, completes the completion stage that was previously sent to the caller of the method at step 312 exceptionally with an indication of failure of the method (step 328). The computer, using a standard completion stage mechanism, sends the indication of the failure to dependent stages that have arranged to receive notification of the failure (step 332). In addition, the computer, using the asynchronous method processing component, stops scheduling execution of the method (step 332). Thereafter, the process terminates.

Returning again to step 326, if the computer, using the asynchronous method processing component, determines that the method has not failed, no output of step 326, then the computer, using the asynchronous method processing component, makes a determination as to whether the method returned null (step 334). If the computer, using the asynchronous method processing component, determines that the method has returned null, yes output of step 334, then the process returns to step 314 where the computer continues to schedule the method for execution. If the computer, using the asynchronous method processing component, determines that the method has not returned null, no output of step 334, then the computer, using the asynchronous method processing component, makes a determination as to whether the method returned as its result the completion stage that was previously sent to the caller of the method at step 312 (step 336).

If the computer, using the asynchronous method processing component, determines that the method has returned as its result the completion stage that was previously sent to the caller of the method at step 312, yes output of step 336, then the process terminates thereafter. If the computer, using the asynchronous method processing component, determines that the method has not returned as its result the completion stage that was previously sent to the caller of the method at step 312, no output of step 336, then the computer, using the asynchronous method processing component, completes the completion stage using a result or an exceptional completion of a different completion stage generated by the method (step 338). Further, the computer, using the standard completion stage mechanism, sends the result or the exceptional completion of the different completion stage generated by the method to dependent stages that have arranged to receive notification of the result or the exceptional completion (step 340). Thereafter, the process terminates.

Thus, illustrative embodiments of the present invention provide a computer-implemented method, computer system, and computer program product for providing a programming model that allows a Java method to be simultaneously designated as both asynchronous, backed by a completion stage or a completable future, and operating on a designated schedule. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for processing methods, the computer-implemented method comprising:

designating, by a computer, a method as schedulable;

generating, by the computer, a container-generated completion stage corresponding to the method, wherein the container-generated completion stage represents an entire set of scheduled executions of the method and remains incomplete across multiple scheduled executions of the method until a final termination condition occurs;

sending, by the computer, the container-generated completion stage to an invoking program context of the method;

scheduling, by the computer, a callback for an execution time of the method;

determining, by the computer, whether the container-generated completion stage has completed;

responsive to the computer determining that the container-generated completion stage has not completed, executing, by the computer, the method on a pooled thread;

receiving, by the computer, a return corresponding to an execution of the method;

determining, by the computer, whether the method returned null while the container-generated completion stage remains incomplete; and responsive to determining that the method has returned null, continuing, by the computer, to schedule the method for a subsequent execution time.

2. The computer-implemented method of claim 1, wherein the method is a schedulable asynchronous method, and wherein the computer designates the method as the schedulable asynchronous method by one of adding a schedule attribute comprising a schedule to an existing annotation of the method, adding a second annotation to the method indicating the schedule, or assigning a trigger class to the method.

3. The computer-implemented method of claim 1 further comprising:

responsive to the computer determining that a state of the container-generated completion stage does not indicate continued execution of the method, terminating, by the computer, the entire set of executions of the method based on the container-generated completion stage being completed.

4. The computer-implemented method of claim 3, wherein a returned result is one of a container-generated completion stage result or a completable future.

5. The computer-implemented method of claim 1 further comprising:

receiving, by the computer, a request from the invoking program context to invoke the method asynchronously;

determining, by the computer, whether the method has a schedule in response to receiving the request; and responsive to the computer determining that the method does have a schedule, generating, by the computer, the container-generated completion stage corresponding to the method to provide a final result of the method.

6. The computer-implemented method of claim 1 further comprising:

sending, by the computer, the container-generated completion stage of the method to the invoking program context;

scheduling, by the computer, a callback for an execution time of the method;

detecting, by the computer, that the execution time of the method has elapsed; and determining, by the computer, a first time whether the container-generated completion stage has completed in response to detecting that the execution time of the method has elapsed.

7. The computer-implemented method of claim 6 further comprising:

responsive to the computer determining that the completion stage has not completed, executing, by the computer, the method on a pooled thread;

determining, by the computer, a second time whether the completion stage has completed in response to executing the method on the pooled thread; and responsive to the computer determining that the container-generated completion stage has not completed, determining, by the computer, whether the method failed during execution on the pooled thread.

8. The computer-implemented method of claim 7 further comprising:

responsive to the computer determining that the method has failed, completing, by the computer, the container-generated completion stage exceptionally with an indication of failure of the method;

sending, by the computer, the indication of the failure to dependent stages that have arranged to receive notification of the failure; and stopping, by the computer, scheduling execution of the method.

9. The computer-implemented method of claim 7 further comprising:

responsive to the computer determining that the method has not failed, determining, by the computer, whether the method returned null; and responsive to the computer determining that the method returned null, continuing, by the computer, to schedule the method for execution.

10. The computer-implemented method of claim 9 further comprising:

responsive to the computer determining that the method has not returned null, determining, by the computer, whether the method returned as its result the container-generated completion stage;

responsive to the computer determining that the method has not returned the container-generated completion stage as the method's result, wherein the container-generated completion stage was sent to the invoking program context, completing, by the computer, the container-generated completion stage using a result or an exceptional completion of a different container-generated completion stage generated by the method; and sending, by the computer, the result or the exceptional completion of the different container-generated completion stage generated by the method to dependent stages that have arranged to receive notification of the result or the exceptional completion.

11. A computer system for processing methods, the computer system comprising:

a communication fabric;

a storage device connected to the communication fabric, wherein the storage device stores program instructions; and a processor connected to the communication fabric, wherein the processor executes the program instructions to:

designate a method as schedulable;

generate a container-generated completion stage corresponding to the method, wherein the container-generated completion stage represents an entire set of scheduled executions of the method and remains incomplete across multiple scheduled executions of the method until a final termination condition occurs;

send the container-generated completion stage to an invoking program context of the method;

schedule a callback for an execution time of the method;

determine whether the container-generated completion stage has completed; responsive to determining that the container-generated completion stage has not completed, execute the method on a pooled thread;

receive a return corresponding to an execution of the method;

determine whether the method returned null while the container-generated completion stage remains incomplete; and responsive to determining that the method returned null, continue to schedule the method for a subsequent execution time.

12. The computer system of claim 11, wherein the method is a schedulable asynchronous method, and wherein the computer system designates the method as the schedulable asynchronous method by one of adding a schedule attribute comprising a schedule to an existing annotation of the method, adding a second annotation to the method indicating the schedule, or assigning a trigger class to the method.

13. The computer system of claim 11, wherein the processor further executes the program instructions to:

terminate a set of executions of the method based on the container-generated completion stage being completed.

14. The computer system of claim 13, wherein a returned result is one of a container-generated completion stage result or a completable future.

15. The computer system of claim 11, wherein the processor further executes the program instructions to:

receive a request from the invoking program context to invoke the method asynchronously;

determine whether the method has a schedule in response to receiving the request; and responsive to determining that the method does have a schedule, generate the container-generated completion stage corresponding to the method to provide a final result of the method.

16. A computer program product for processing methods, the computer program product comprising a computer-readable storage medium having program instructions embodied therewith, the program instructions executable by a computer to cause the computer to perform a method of:

designating, by the computer, a method as schedulable;

generating, by the computer, a container-generated completion stage corresponding to the method, wherein the container-generated completion stage represents an entire set of scheduled executions of the method and remains incomplete across multiple scheduled executions of the method until a final termination condition occurs;

sending, by the computer, the container-generated completion stage to an invoking program context of the method;

scheduling, by the computer, a callback for an execution time of the method;

determining, by the computer, whether the container-generated completion stage has completed;

responsive to the computer determining that the container-generated completion stage has not completed, executing, by the computer, the method on a pooled thread;

receiving, by the computer, a return corresponding to an execution the method;

determining, by the computer, whether the method returned null while the container-generated completion stage remains incomplete; and responsive to determining that the method has returned null, continuing, by the computer, to schedule the method for a subsequent execution time.

17. The computer program product of claim 16, wherein the method is a schedulable asynchronous method, and wherein the computer designates the method as the schedulable asynchronous method by one of adding a schedule attribute comprising a schedule to an existing annotation of the method, adding a second annotation to the method indicating the schedule, or assigning a trigger class to the method.

18. The computer program product of claim 16 further comprising:

responsive to the computer determining that a state of the container-generated completion stage does not indicate continued execution of the method, terminating, by the computer, the entire set of executions of the method based on the container-generated completion stage being completed.

19. The computer program product of claim 18, wherein a returned result is one of a container-generated completion stage result or a completable future.

20. The computer program product of claim 16 further comprising:

receiving, by the computer, a request from the invoking
program context to invoke the method asynchronously;
determining, by the computer, whether the method has a
schedule in response to receiving the request; and
responsive to the computer determining that the method
does have a schedule, generating, by the computer, the
container-generated completion stage corresponding to
the method to provide a final result of the method.

\* \* \* \* \*